United States Patent [19]

Henry

[11] Patent Number: 5,995,027
[45] Date of Patent: Nov. 30, 1999

[54] DIGITAL-SIGNAL CODING BY BREAKDOWN INTO FREQUENCY SUBBANDS AND FINITE STATE VECTORIAL QUANTIZATION

[75] Inventor: Félix Henry, Rennes, France

[73] Assignee: Canon Kabushiki Kaisha, Tokyo, Japan

[21] Appl. No.: 08/951,753

[22] Filed: Oct. 16, 1997

[30] Foreign Application Priority Data

Nov. 8, 1996 [FR] France ..................................... 9613651

[51] Int. Cl.$^6$ .............................. G06K 9/36; H03M 7/00
[52] U.S. Cl. ............................................. 341/50; 382/253
[58] Field of Search ....................... 341/50, 52; 382/232, 382/238, 253

[56] References Cited

U.S. PATENT DOCUMENTS 4,987,480  1/1991  Lippman et al. .......................... 358/13
5,561,464  10/1996  Park ........................................ 348/397

FOREIGN PATENT DOCUMENTS 0555017  8/1993  European Pat. Off. .
95/27375  10/1995  WIPO .

OTHER PUBLICATIONS

Jeanrenaud, P et al. "Recursive Subband Image Coding With Adaptive Prediction and Finite State Vector Quantization", Signal Processing 20, No. 1, May, 1990 (pp. 25–42).
Shapiro, J. "Embedded Image Coding Using Zerotrees of Wavelet Coefficients", IEEE Trans. on Signal Processing, Vol. 41, No. 12, Dec. 1993 (pp. 3445–3462).
Perlmutter, S. et al. "A Finite–State Multiresolution Approach to Image Compression Using Pruned Nested Tree–Structured Vector Quantization", IEEE—Records of the Asilomar Conf. on Signals, Systems and Computers, Pacific Grove, Oct. 30–Nov. 2, 1994, vol. 1, Oct. 30, 1994 (pp.474–481).
Lotti, F. et al. "Content–Driven Pyramid Compression of Medical Images for Error–Free Archival and Progressive Transmission", Eur. Trans. on Telecomm. and Rel. Techn., vol. 6, No. 3, May–Jun. 1995 (pp. 301–310).
Carlini, P. et al. Self Similar Progressive Image Coding Scheme for Multimedia Packet Switching Communications, Eur. Trans. on Telecomm. and Rel. Techn., vol. 6, No. 3, May–Jun. 1995 (pp. 1768–1772).
Cosman, P, et al. "Vector Quantization of Image Subbands: A Survey", IEEE Trans. on Image Processing, vol. 5, No. 2, Feb. 1996 (pp. 202–225).
Panchanathan, S. et al. "Image Scalability Using Wavelet Vector Quantization" J. Electronic Imaging, vol. 5, No. 2 Apr. 1996 (pp. 167–174).

*Primary Examiner*—Brian Young
*Assistant Examiner*—Peguy Jean Pierre
*Attorney, Agent, or Firm*—Fitzpatrick Cella Harper & Scinto

[57] ABSTRACT

In order to code a digital signal (IM), the invention combines a breakdown of the digital signal into frequency subbands and a finite state vectorial quantization of the subbands. The digital signal is analysed in a plurality of frequency subbands distributed in accordance with at least two different resolutions, and then the subbands of higher resolution are coded by finite state vectorial quantization as a function of the subbands of lower resolution.

21 Claims, 10 Drawing Sheets

DIGITAL-SIGNAL CODING BY BREAKDOWN INTO FREQUENCY SUBBANDS AND FINITE STATE VECTORIAL QUANTIZATION

FIELD OF THE INVENTION

The present invention concerns in general terms the compression of a digital signal and proposes to this end a device and a method for coding a digital signal through the breakdown of the signal into frequency subbands and the finite state vectorial quantization of the coefficients resulting from the breakdown into subbands.

BACKGROUND OF THE INVENTION

In order to transmit and/or to store to memory a digital signal, such as an image signal, it is frequently necessary to compress it in order to reduce the transmission time and/or memory space used.

Amongst the compression codes, finite state vectorial quantization uses a set of codebooks. This compression technique consists of dividing the digital signals into blocks, or vectors, of predetermined size, without an overlap. Generally, a vector is a group of adjacent digital samples of the digital signal. In the case of an image signal, a vector is a group of adjacent pixels.

A first vector is coded by selecting a code vector from a first codebook, associated with an initial state. An index associated with the code vector selected is a compressed, or coded, form of the first vector. The following state is determined in accordance with the preceding state and the code vector selected during the preceding state. The following vector is coded by selecting a code vector from a codebook associated with the determined state, and so forth.

In this type of compression coding, when the codebook associated with the determined state does not enable the current vector to be coded to a sufficiently high quality, the codebook associated with the following state likewise does not enable high-quality coding to be effected. An approximation of a given state is thus passed on to all the following states. In the field of finite state machines, this phenomenon is known as derailment. This phenomenon leads to a poor restitution of the digital signal. In the case of an image signal, this causes a distortion of the reconstructed image.

In addition, it is known that a signal can be broken down into frequency subbands before being compressed. Breakdown consists of creating, from the signal, a set of subbands which each contain a limited frequency range. The subbands can be of different resolutions, the resolution of a subband being the number of samples per unit of length used to represent this subband.

SUMMARY OF THE INVENTION

The subbands can then be coded more effectively than the original signal. In the case of a digital image signal, a frequency subband of this signal is itself an image. However, the breakdown of a signal into frequency subbands does not create any compression in itself.

The present invention aims to remedy the drawbacks of the prior art, by providing a device and a method for compressing digital signals which offers a high compression to distortion ratio.

Coding according to the invention combines a breakdown of the digital signal into frequency subbands and a finite state vectorial quantization of the subbands.

To this end, the invention proposes to analyse the digital signal in a plurality of frequency subbands distributed in accordance with at least two different resolutions, and to code by finite state vectorial quantization the subbands of greater resolution as a function of the subbands of lower resolution.

The invention proposes notably a method of coding a digital signal by dividing the signal into a plurality of vectors and comparing each of these vectors with code vectors forming part of a plurality of codebooks, including a step of analysing the digital signal in a plurality of frequency subbands distributed in accordance with at least two different resolutions, at least one first subband having a lower resolution and at least one second subband having a higher resolution, characterised in that it includes, for each second subband, the steps of:
  selecting a first subband,
  dividing the said first subband selected into first vectors,
  dividing the said second subband into second vectors,
  extracting, for each of the second vectors, a first vector linked by a predetermined relationship to the second vector,
  selecting, for each of the second vectors, a codebook from the plurality of codebooks, in accordance with the first vector extracted,
  coding each of the second vectors, by selecting a code vector from the selected codebook, respectively, in order to form a second coded subband.

Correlatively, the invention proposes a device for coding a digital signal by dividing the signal into a plurality of vectors and comparing each of these vectors with code vectors forming part of a plurality of codebooks, having a means of storing to memory the plurality of codebooks and a means of analysing the digital signal in a plurality of frequency subbands distributed in accordance with at least two different resolutions, at least one first subband having a lower resolution and at least one second subband having a higher resolution, characterised in that it has means for:
  dividing the said first subband into first vectors,
  dividing the said second subband into second vectors,
  extracting, for each of the second vectors, a first vector linked by a predetermined relationship to the second vector,
  selecting, for each of the second vectors, a codebook from the plurality of codebooks, in accordance with the first vector extracted,
  coding each of the second vectors by selecting a code vector from the selected codebook, respectively, in order to form a second coded subband.

The code vector is conventionally associated with an index, which is a compressed form of the second vector.

The first and second vectors linked by the predetermined relationship generally have interdependent positions in the signal and, according to a preferred embodiment, have the same position in the signal.

The method and the device according to the invention consist of using on the one hand the inter-band, scale or resolution correlation of the signal and on the other hand the spatial correlation in the case of an image signal, or the time or frequency correlation in the case of an acoustic signal, for example, in order to code the signal in order to compress it.

The invention makes it possible to attain a high compression to distortion ratio. This is because the combined use of resolution and spatial correlations makes it possible either to reduce the distortion appreciably, for an equal compression rate, or to increase the compression rate, for a given distortion, compared with the prior art.

According to a preferred characteristic, the second subband is of a resolution immediately higher than the first subband. Where there is a succession of subbands of increasing resolution, each subband, except that/those of the lowest resolution, is coded in accordance with a subband with an immediately lower resolution.

Advantageously, the first subband is coded into a first coded subband, and the first coded subband is decoded, prior to the step of dividing into first vectors.

The first subband is either coded conventionally when it has the lowest resolution in the breakdown, or coded, as the second subband, on the basis of another first subband when it has an intermediate resolution in the breakdown, which then has at least three resolution levels. It is preferable, in all cases, to code the second subband on the basis of the first coded and then decoded subband, as it is the latter which will be available after transmission and decoding, or reading in memory and decoding.

According to a preferred characteristic, the digital signal is an image signal.

In this case, the first and second vectors correspond preferably to the same position in the image, and are situated respectively in subbands of the same orientation. The resolution correlation is thus used effectively and rapidly.

In another aspect, the invention proposes a method for decoding a digital signal coded using the method according to the invention, characterised in that it includes the steps of:

extracting, for each of the second coded vectors of the second coded subband, a first vector of the first subband, linked by the predetermined relationship to the second coded vector, selecting, for each of the second coded vectors of the second coded subband, a codebook from a plurality of codebooks, in accordance with the first vector extracted, decoding each of the second coded vectors of the second coded subband, by selecting a code vector from the codebook selected, respectively, in order to form a second decoded subband.

Correlatively, the invention proposes a device for decoding a digital signal coded using the device according to the invention having a means for storing to memory a plurality of codebooks, characterised in that it has means for:

extracting, for each of the second coded vectors of the second coded subband, a first vector of the first subband, linked by the predetermined relationship to the second coded vector, selecting, for each of the second coded vectors of the second coded subband, a codebook from the plurality of codebooks, in accordance with the first vector extracted, decoding each of the second coded vectors of the second coded subband, by selecting a code vector from the codebook selected, respectively, in order to form a second decoded subband.

For coding and decoding, for one and the same second vector to be coded or decoded, the same codebook is selected without an additional item of codebook selection information being necessary. Thus the coding effected offers a good compression rate, whilst being precise by virtue of the number of codebooks used.

According to a preferred characteristic, the first coded subband is decoded prior to the decoding of the second subband.

The invention can easily be used in a computer, a database management system or, in the case of an image signal, in a system for processing still or moving images, such as a digital photographic device or a digital camera.

The characteristics and advantages of the present invention will emerge more clearly from a reading of several embodiments illustrated by the accompanying drawings, in which.

DETAILED DESCRIPTION OF THE DRAWINGS

Figure 1:
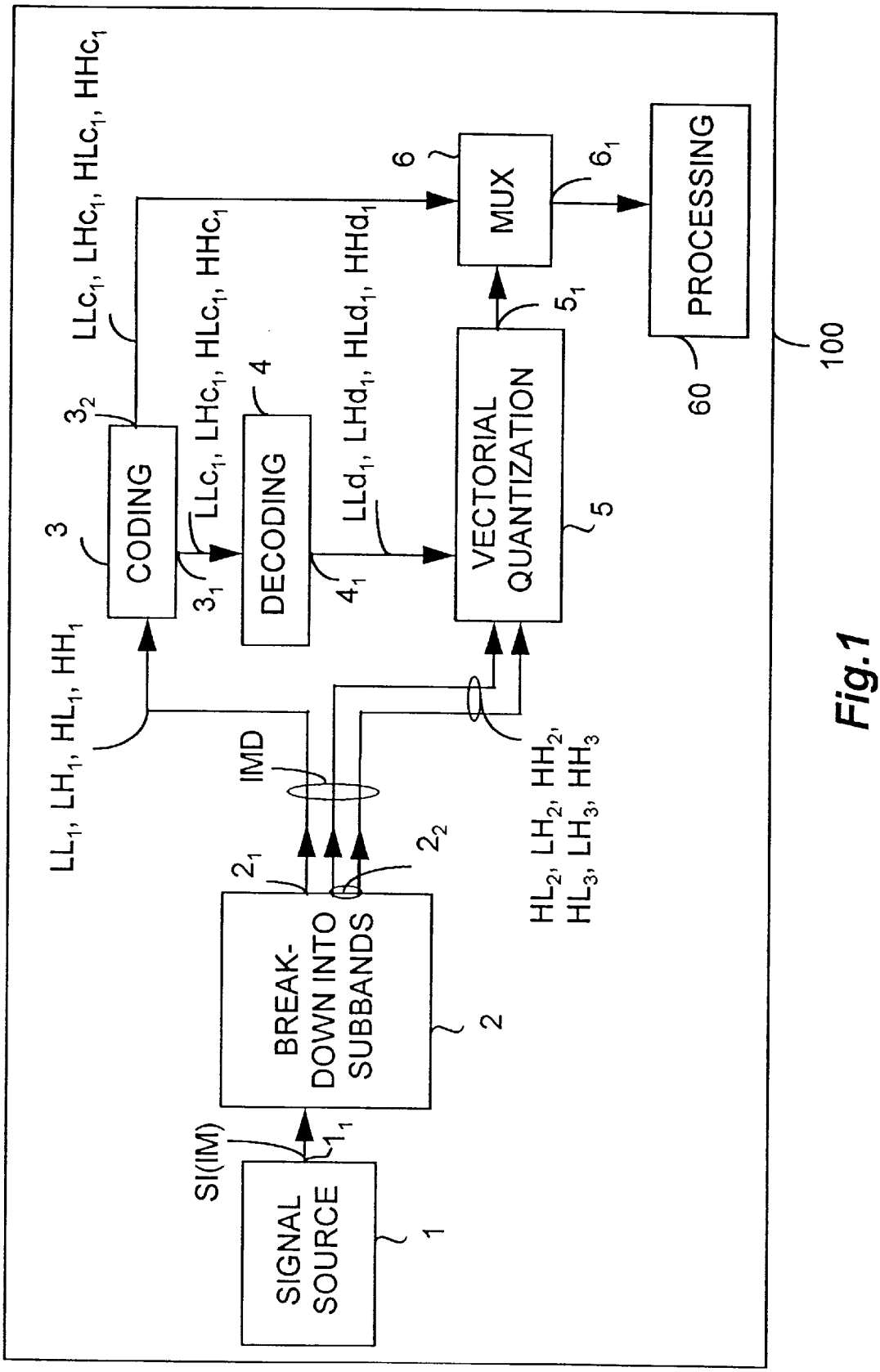
FIG. 1 is a block diagram of an embodiment of a device for coding digital signals according to the invention.

According to the chosen embodiment depicted in FIG. 1, a coding device according to the invention is designed to code a digital signal for the purpose of compressing it. The coding device is integrated in an appliance 100, which is for example a digital photographic appliance or a digital camcorder, or a database management system or a computer.

The digital signal to be compressed SI is in this particular embodiment a series of digital samples representing an image.

The device has a signal source 1, here the image signal. Generally, the signal source either contains the digital signal, and is for example a memory, a hard disk or a CD ROM, or converts an analogue signal into a digital signal, and is for example an analogue camcorder associated with an analogue to digital converter. An output $1_1$ of the signal source is connected to a circuit for analysis or for breakdown into subbands 2. The circuit 2 has a first output $2_1$, connected to a coding circuit 3.

Second outputs $2_2$ of the breakdown circuit 2 are connected to a finite state vectorial quantization circuit 5. The coding circuit 3 has a first output $3_1$, connected to a decoding circuit 4, one output $4_1$ of which is connected to the vectorial quantization circuit 5. The coding circuit 3 has a second output $3_2$ connected to a multiplexer 6. The vectorial quantization circuit 5 has an output $5_1$ connected to the multiplexer 6. An output $6_1$ of the multiplexer 6 forms the output of the coding device according to the invention. The output $6_1$ is connected to a processing circuit 60, which is for example a transmission circuit or a memory.

The image source 1 is a device for generating a series of digital samples representing an image IM. The source 1 has an image memory and supplies a digital image signal SI to the input of the breakdown circuit 2. The image signal SI is a series of digital words, for example octets. Each octet value represents a pixel of the image IM with 256 grey scales, or a black and white image.

Figure 2:
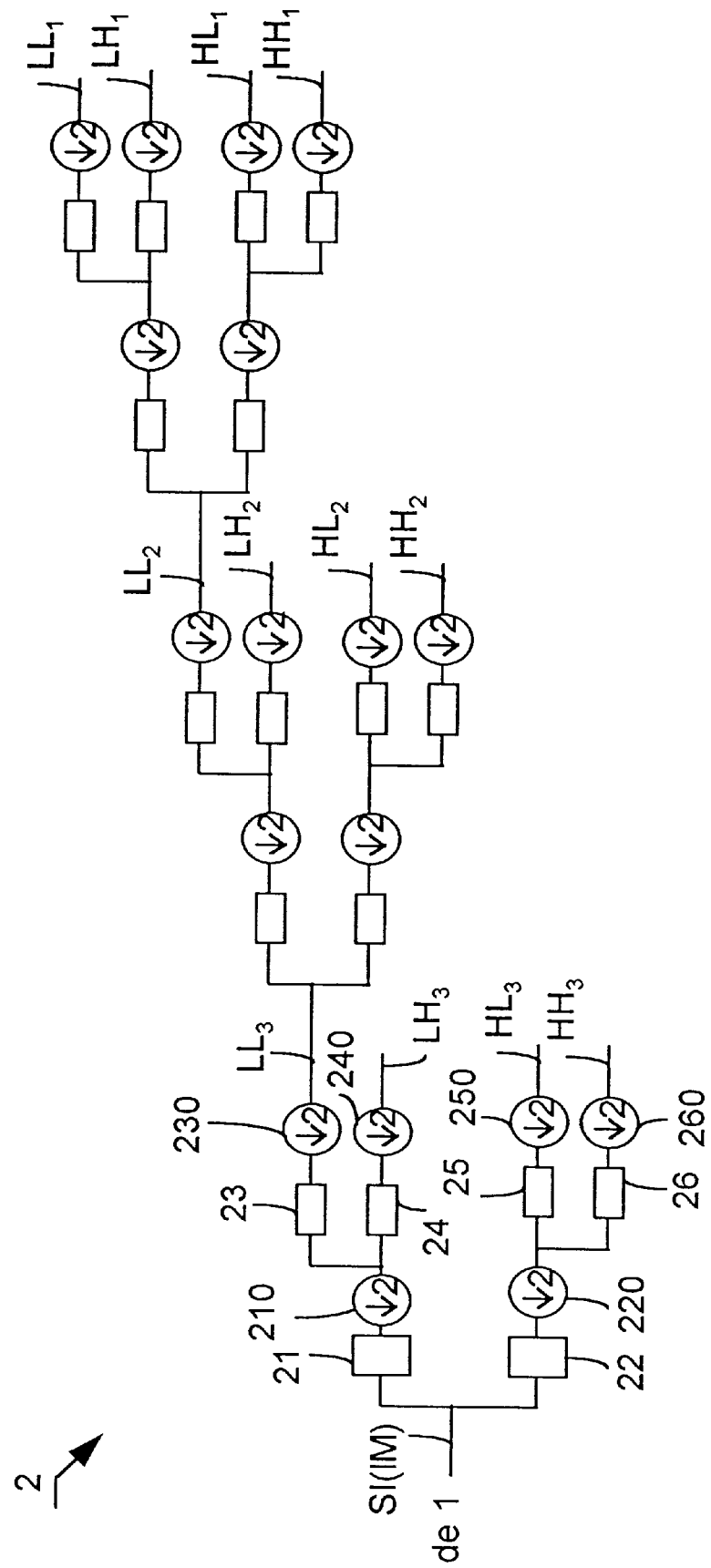
FIG. 2 is a circuit for breakdown into frequency subbands, included in the device of FIG. 1.

The circuit for the breakdown into subbands 2, or analysis circuit, is a conventional set of filters, respectively associated with two-times decimators, which filter the image signal in two directions, into subbands of high and low spatial frequencies. According to FIG. 2, the circuit 2 has three successive analysis blocks for breaking down the image IM into subbands in accordance with three resolution levels.

Generally, the resolution of a signal is the number of samples per unit of length used to represent this signal. In the case of an image signal, the resolution of a subband is linked with the number of samples per unit of length for representing this subband. The resolution depends on the number of decimations effected.

The first analysis block receives the digital image signal and applies it to two respectively low-pass and high-pass digital filters 21 and 22, which filter the image signal in a first direction, for example horizontal in the case of an image signal. After passing through the two-times decimators 210 and 220, the resulting filtered signals are respectively applied to two low-pass filters 23 and 25 and high-pass filters 24 and 26, which filter them in a second direction, for example vertical in the case of an image signal. Each resulting filtered signal passes through a respective two-times decimator 230, 240, 250 and 260. The first block delivers as an output four subbands $LL_3$, $LH_3$, $HL_3$ and $HH_3$ with the highest resolution $RES_3$ in the breakdown.

The subband $LL_3$ has the low-frequency components, or coefficients, in both directions, of the image signal. The subband $LH_3$ has the low-frequency components in a first direction and high-frequency components in a second direction, of the image signal. The subband $HL_3$ has the high-frequency components in the first direction and the low-frequency components in the second direction. Finally, the subband $HH_3$ has the high-frequency components in both directions.

Each subband is an image constructed from the original image, which contains information corresponding to a respectively vertical, horizontal and diagonal orientation of the image, in a given frequency band.

The subband $LL_3$ is analysed by an analysis block similar to the above in order to provide four subbands $LL_2$, $LH_2$, $HL_2$ and $HH_2$ with an intermediate resolution level $RES_2$ in the breakdown. The subband $LL_2$ has the low-frequency components in both directions of analysis, and is in turn analysed by the third analysis block identical to the preceding two. The third analysis block provides subbands $LL_1$, $LH_1$, $HL_1$ and $HH_1$, with the lowest resolution $RES_1$ in the breakdown, resulting from the cutting of the subband $LL_2$ into subbands.

Each of the subbands of resolution $RES_2$ and $RES_3$ also corresponds to an orientation in the image.

The breakdown effected by the circuit 2 is such that a subband of a given resolution is cut into four subbands of lower resolution and thus has four times as many coefficients as each of the subbands of lower resolution.

Figure 4:
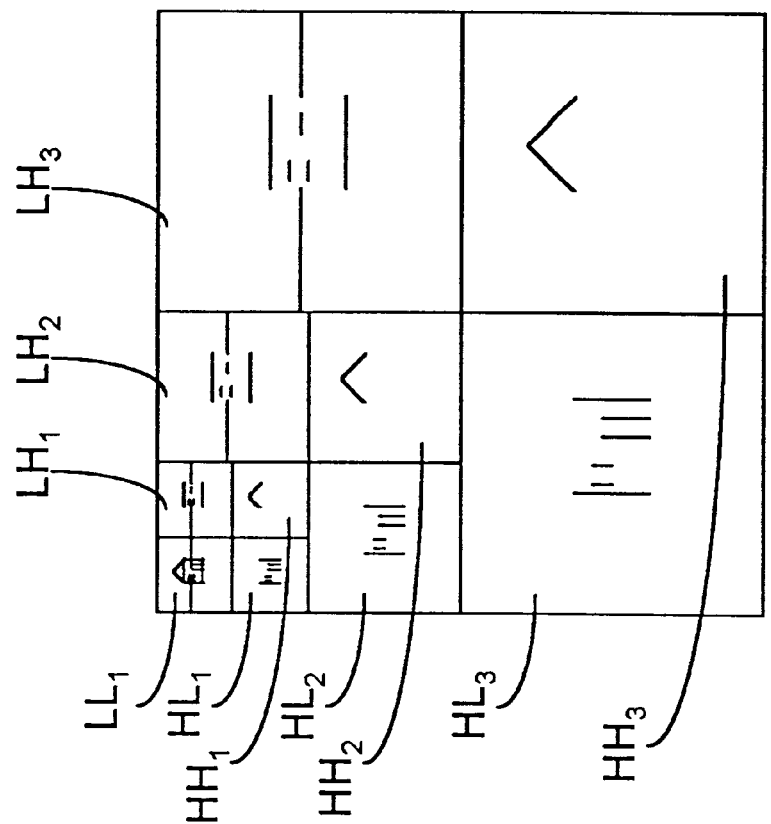
FIG. 4 is an image broken down into subbands by the circuit of FIG. 2.
Figure 3:
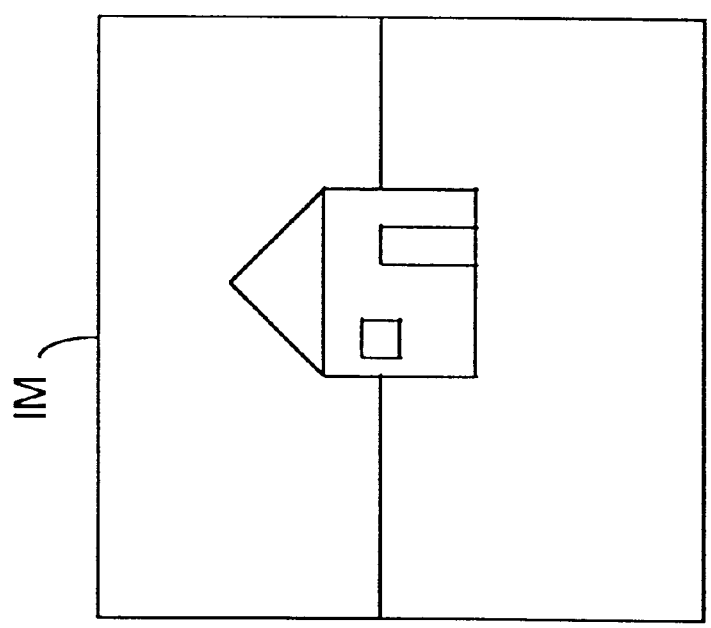
FIG. 3 is a digital image to be coded by the coding device according to the invention.

A digital image IM at the output of the image source 1 is depicted schematically in FIG. 3, whilst FIG. 4 depicts the image IMD resulting from the breakdown of the image IM into ten subbands in accordance with three resolution levels, by the circuit 2. The image IMD has as much information as the original image IM, apart from the losses due to filtering, but the information is frequentially cut in accordance with three resolution levels.

The lowest resolution level $RES_1$ has the subbands LL1, HL1, LH1 and HH1, that is to say the low frequency subbands in both directions of analysis. The second resolution level $RES_2$ has the subbands HL2, LH2 and HH2 and the highest resolution $RES_3$ has the highest-frequency subbands HL3, LH3 and HH3.

Naturally, the number of resolution levels, and consequently of subbands, can be chosen differently, for example 13 subbands and four resolution levels for a bi-dimensional signal such as an image. The number of subbands per resolution level can likewise be different.

Generally, the number of analysis directions depends on the dimension of the signal to be analysed, and more precisely, these two values are equal. The analysis and synthesis circuits are adapted to the dimension of the processed signal.

The subbands LL1, LH1, HL1 and HH1 with the lowest resolution $RES_1$ are applied to the coding circuit 3, which codes them respectively into coded, or compressed, subbands LL1c, LH1c, HL1c and HH1c.

The coding circuit 3 effects a DPCM coding (Differential Pulse Code Modulation), which is a coding by means of linear prediction, with loss. Each pixel of the subbands to be coded LL1, LH1, HL1 and HH1 is predicted according to its neighbours and this prediction is subtracted from the value of the pixel in question, for the purpose of forming a differential "image" which has less correlation between pixels than the original image. The differential image is then quantized and coded using Huffmann coding.

The subbands thus coded by the circuit 3 are applied to the multiplexer 6 and to the decoding circuit 4.

The decoder 4 decodes the coded subbands LL1c, LH1c, HL1c and HH1c and supplies decoded, or decompressed, subbands LL1d, LH1d, HL1d and HH1d to the vectorial quantization circuit 5. The decoded subbands are used to code by vectorial quantization the other subbands of higher resolution, as explained hereinafter. Thus, according to the invention, the resolution correlation is used to compress the image signal.

Figure 5:
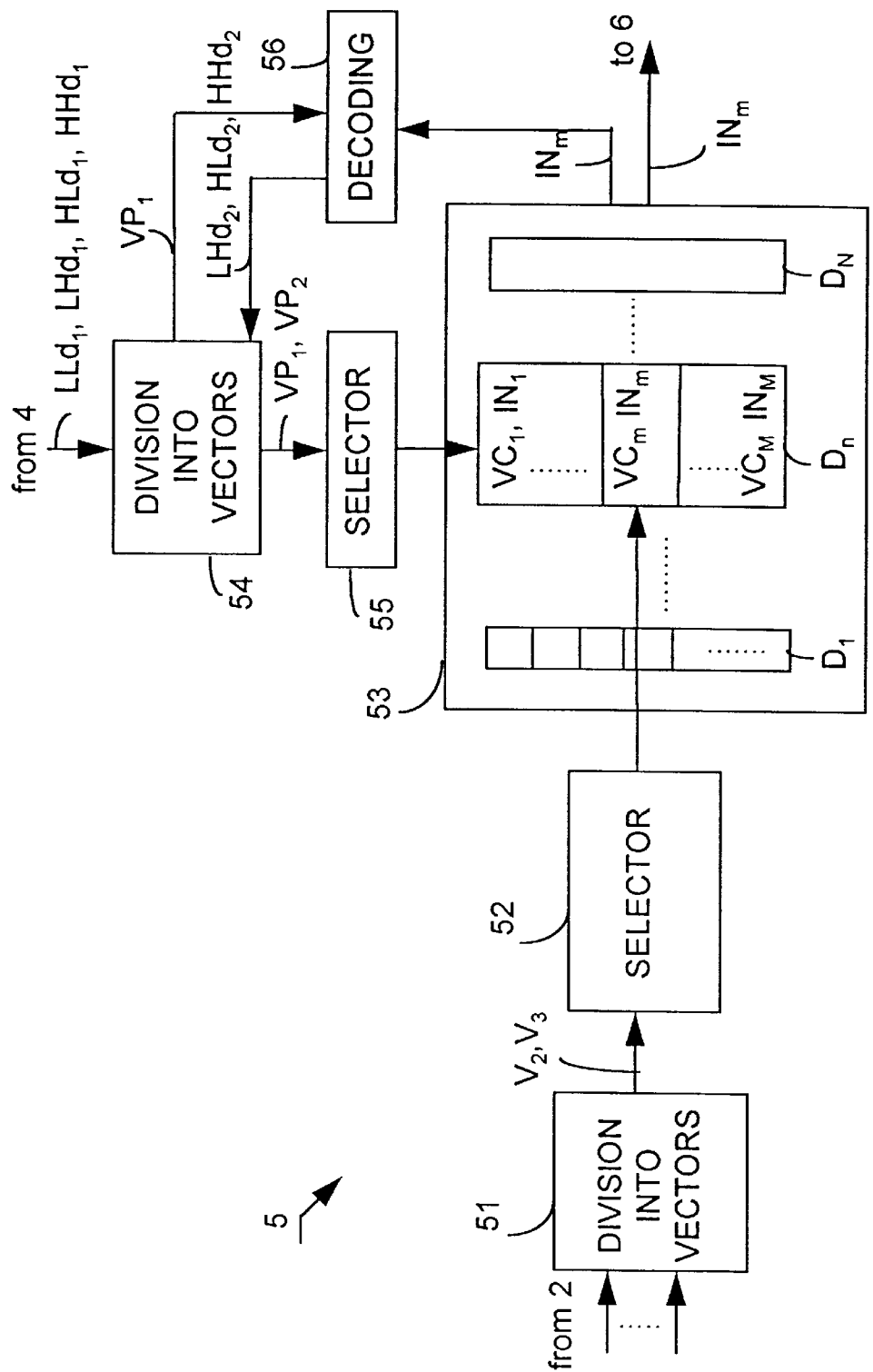
FIG. 5 is a vectorial quantization circuit included in the coding device according to the invention.

FIG. 5 depicts the finite state vectorial quantization coding circuit 5. Coding by vectorial quantization uses the spatial correlation which exists in the image, by processing the pixels by blocks, or vectors, of adjacent pixels. Coding is effected subband by subband. The circuit 5 codes the subbands of higher resolution $RES_2$ and $RES_3$ received from the circuit 2, and has for this purpose a circuit for dividing into vectors 51, connected to a selector 52 and to a memory 53. The memory 53 has N codebooks $D_1$ to $D_N$ containing respectively code vectors $VC_1$ to $VC_M$, where M and N are integers. Each code vector is associated with an index $IN_1$ to $IN_M$.

The circuit 5 also has a second circuit for dividing into vectors 54, one input of which is connected to the decoding circuit 4 and a first output of which is connected to a second selector 55. A second output of the circuit 54 is connected to a decoding circuit 56. The second selector 55 is connected to the memory 53.

An output of the memory 53 of codebooks is connected to the circuit 6 and to the decoding circuit 56, whose output is connected to the second dividing circuit 54.

The decoding circuit 4 supplies the subbands of low resolution $RES_1$, coded and then decoded, to the dividing circuit 54. The circuit 54 divides each of the subbands $HLd_1$, $HHd_1$ and $LHd_1$ into parent vectors $VP_1$ of predetermined size, for example, into blocks of two by two coefficients.

Simultaneously, the dividing circuit 51 receives the subbands of higher resolution $RES_2$ and $RES_3$ from the circuit 2. The dividing circuit 51 firstly processes the subbands of resolution $RES_2$ and divides each of the subbands $HL_2$, $LH_2$ and $HH_2$ of resolution $RES_2$ into vectors to be coded $V_2$ of predetermined size, for example into blocks of four by four coefficients.

The size of the vectors to be coded $V_2$ is chosen so as to be four times larger than that of the parent vectors $VP_1$, so that there is the same number of vectors to be coded $V_2$ as parent vectors $VP_1$. Each vector to be coded $V_2$ of a subband of given orientation is linked by a predetermined relationship to a parent vector $VP_1$.

The predetermined relationship defines the position of the parent vector $VP_1$ in the signal as a function of that of the vector $V_2$. The position of a vector in a signal is defined generally by the coordinates of the vector. The position of the vector $V_2$ and the position of the parent vector $VP_1$ linked thereto are interdependent. According to a preferred embodiment, the linked vector $V_2$ and parent vector $VP_1$ have the same position in the signal, here in the image. In addition, the parent vector $VP_1$ is situated in the subband of lower resolution and of the same orientation as the subband of the vector $V_2$.

In a variant, the parent vector can be replaced by a vector of larger size, including the parent vector, for example centred on the latter.

The ratio between the sizes of the parent vectors and the vectors to be coded depends on the prior breakdown. According to another variant, the breakdown into subbands is such that the ratio of the sizes between subbands of different resolution is not four but another value. The respective sizes of the parent vectors and the vectors to be coded are then adapted to this ratio so that a parent vector and a vector to be coded, corresponding to one and the same position in the image, are associated.

In order to code one of the vectors $V_2$, the circuit 51 supplies the vector $V_2$ to the selector 52 and the circuit 54 supplies to the selector 55 the parent vector $VP_1$ corresponding to the same position in the original image, and chosen from the subband of the same orientation.

The selector 55 classifies the parent vector $VP_1$ by comparing each of its coefficients with thresholds, for example two respectively positive and negative thresholds, which gives three possibilities for each coefficient. In the case of a vector with four coefficients, there are thus $3^4=81$ classes, each corresponding to a codebook $D_n$ of code vectors. Depending on the class of the parent vector $VP_1$, the selector 55 selects one of the codebooks $D_n$ with n integer between 1 and N.

In a variant, other methods of classification are possible. For example, the codebook $D_n$ is selected in accordance with the energy of the parent vector $VP_1$. The energy of a vector is the mean quadratic error calculated on the coefficients of the vector. The range of possible energies is divided into intervals, each of which is associated with a codebook. The energy of the parent vector $VP_1$ is situated in one of the intervals, and consequently corresponds to one of the codebook.

In the case of the selection of a codebook on the basis of the energy of the parent vector, the codebook can be chosen in accordance with the parent vectors situated in several subbands of lower resolution. These subbands can be of different orientations and/or of different resolutions.

The selector 52 then selects one of the vectors $VC_m$ from the selected codebook $D_n$. The vector $VC_m$ is selected so as to be as similar as possible to the vector to be coded $V_2$. The associated index $IN_m$ is a coded form of the vector $V_2$ and is supplied to the circuit 6 and to the decoding circuit 56.

Each of the vectors $V_2$ of each of the subbands of intermediate resolution $RES_2$ is thus coded into an index $IN_m$ as a function of the respective parent vector $VP_1$, corresponding to the same position in the original image, and chosen from the subband of the same orientation and of lower resolution $RES_1$. The set of indices $IN_m$ corresponding to the vectors $V_2$ of each subband $LH_2$, $HL_2$ or $HH_2$ of intermediate resolution $RES_2$ is a respective coded subband $LHc_2$, $HLc_2$ or $HHc_2$.

The decoding circuit 56 decodes the index $IN_m$ in a similar way to the vectorial dequantization circuit 9 described hereinafter (FIG. 6) and uses for this purpose the parent vector $VP_1$ supplied by the circuit 54. The decoding circuit 56 supplies decoded subbands $LHd_2$, $HLd_2$ and $HHd_2$ to the dividing circuit 54.

Each of the decoded subbands is divided into parent vectors $VP_2$ by the dividing circuit 54.

The parent vector $VP_2$ is used to code the vector $V_3$ of the subband of the same orientation and of immediately higher level of resolution $RES_3$, corresponding to the same position in the original image IM. The parent vector $VP_2$ is used in an identical manner to the parent vector $VP_1$. The subbands $LH_3$, $HL_3$ and $HH_3$ are respectively coded into coded subbands $LHc_3$, $HLc_3$ and $HHc_3$ having indices $IN_m$.

The coded subbands $LHc_3$, $HLc_3$ and $HHc_3$ of higher resolution $RES_3$ are transmitted to the circuit 6 but are not decoded by the circuit 56 as there is no subband of higher resolution to be coded.

The parent vectors used are preferably vectors coming from successively coded and then decoded frequency subbands; this is because, in the decoding device described hereinafter, the parent vectors will of necessity have this characteristic as only the decoded information will then be available. In order to prevent coding approximations from being passed on, the coding device also uses decoded information for coding the frequency subbands.

The multiplexer 6 receives the coded subbands $LLc_1$, $LHc_1$, $HLc_1$ and $HHc_1$ of lower resolution on the one hand, and the coded subbands $LHc_2$, $HLc_2$ and $HHc_2$ and $LHc_3$, $HLc_3$ and $HHc_3$ on the other hand, and effects a shaping of the data.

The original image IM has thus been broken down into subbands and then coded by finite state vectorial quantization, and can then by transmitted by a conventional transmission circuit to a receiver associated with a decoding device described hereinafter. In a variant, the coded image can be stored in a memory in order to be read and decoded by the decoding device.

Figure 6:
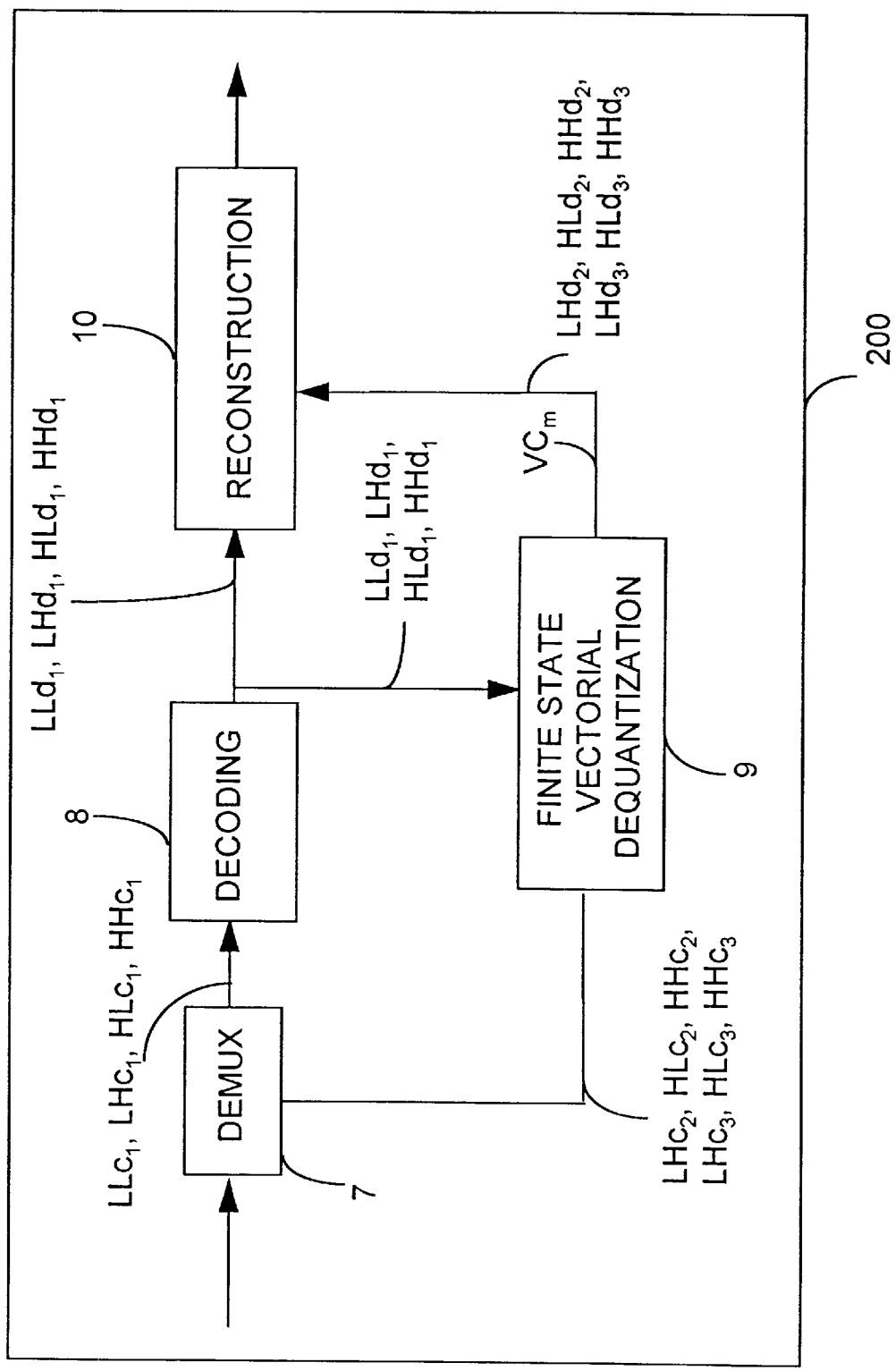
FIG. 6 is a block diagram of an embodiment of a decoding device according to the invention.

With reference to FIG. 6, the decoding device effects roughly the reverse operations to those of the coding device. The decoding device is integrated in an appliance 200 which is for example a digital image reader or a digital video sequence reader or a database management system or a computer.

One and the same appliance can simultaneously include the coding device and the decoding device according to the invention, in order to effect coding and decoding operations. Elements of the decoding device can advantageously be used by the coding device. These elements are then shared by the two devices.

The decoding device has a demultiplexer 7, a first output of which is connected to a decoding circuit 8 and a second output of which is connected to a finite state vectorial dequantization circuit 9.

The decoding circuit 8 is connected to the dequantization circuit 9 and to an image reconstruction circuit 10. The dequantization circuit 9 also has an output connected to the reconstruction circuit 10.

The demultiplexer 7 separates the coded subbands $LLc_1$, $LHc_1$, $HLc_1$ and $HHc_1$ of lower resolution $RES_1$ from the other subbands $LHc_2$, $HLc_2$, $HHc_2$, $LHc_3$, $HLc_3$ and $HHc_3$ of higher resolution $RES_2$ and $RES_3$.

The coded subbands of lower resolution $RES_1$ are decoded by the decoding circuit 8, which is identical to the circuit 4 included in the coding device (FIG. 1). The decoding circuit 8 supplies the decoded subbands $LLd_1$, $HLd_1$, $LHd_1$ and $HHd_1$ to the reconstruction circuit 10 and to the dequantization circuit 9.

Figure 7:
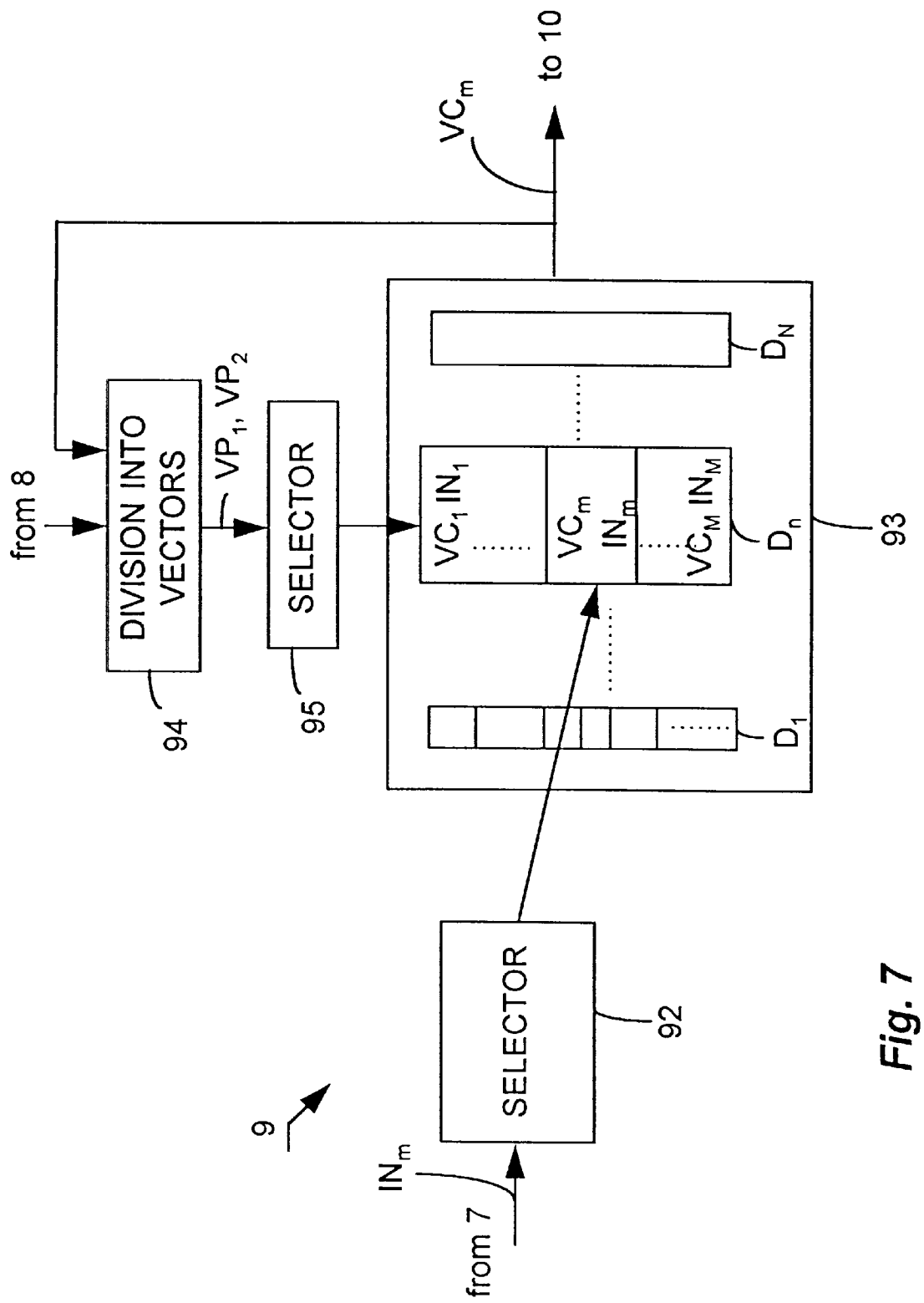
FIG. 7 is a vectorial dequantization circuit included in the coding device according to the invention.

The demultiplexer 7 supplies the coded subbands of higher resolution $RES_2$ and $RES_3$ to the dequantization circuit 9. The circuit 9, described with reference to FIG. 7, effects a subband by subband decoding, and has to this end a selector 92 connected to a memory 93, identical to the memory 53 of the coding device, and having N codebooks $VC_m$ respectively associated with indices $IN_m$.

The dequantization circuit 9 also has a circuit for dividing into vectors 94 and a second selector 95, an input of which is connected to the decoding circuit 8 and an output of which is connected to the memory 93. An output of the memory 93 is connected to the reconstruction circuit 10 and to the dividing circuit 94.

The dequantization circuit 9 receives on the one hand from the demultiplexer 7 an index $IN_m$ of a coded subband of intermediate resolution $RES_2$ and receives on the other hand from the decoding circuit 8 the decoded subbands $LHd_1$, $HLd_1$ and $HHd_1$. The circuit for dividing into vectors 94 forms parent vectors $VP_1$ of the same size as the vectors $VP_1$ formed in the vectorial quantization circuit 5 described with reference to FIGS. 1 and 5. As already explained, the size of the vectors $VP_1$ and their number are linked to the breakdown into subbands.

In order to decode the received index $IN_m$, the parent vector VP1 of the subband of the same orientation and of immediately lower resolution $RES_1$, corresponding to the same position as the index $IN_m$ to be decoded in the subband of resolution $RES_2$, is classified by comparing each of its coordinates with thresholds, as in the selector 55 described above.

The selector 95 selects, in accordance with the classification of the parent vector $VP_1$, a codebook $D_n$, and the selector 92 extracts from the selected codebook $D_n$ the code vector $VC_m$ corresponding to the index to be decoded $IN_m$.

All the code vectors $VC_m$ corresponding to each of the coded subbands $LHc_2$, $HLc_2$ and $HHc_2$ form respectively a decoded subband $LHd_2$, $HLd_2$ and $HHd_2$.

The decoded subbands $LHd_2$, $HLd_2$ and $HHd_2$ are supplied to the image reconstruction circuit 10 and to the dividing circuit 94. The dividing circuit 94 divides the decoded subbands into parent vectors $VP_2$ of the same size as the vectors VP1 described above.

In order to decode an index $IN_m$ in the coded subband of immediately higher resolution $RES_3$, the selector 95 uses the parent vector $VP_2$ corresponding to the same position in the original image as the index $IN_m$ and situated in the subband of the same orientation, in order to select the codebook $D_n$ from which the code vector $VC_m$ will be extracted.

The coded subbands $LHc_3$, $HLc_3$ and $HHd_3$ are thus decoded into decoded subbands $LHd_3$, $HLd_3$ and $HHd_3$.

The circuit 10 receives on the one hand the decoded subbands $LLd_1$, $HLd_1$, $LHd_1$ and $HHd_1$ of lower resolution $RES_1$ and on the other hand the decoded subbands $LHd_2$, $HLd_2$, $HHd_2$, $LHd_3$, $HLd_3$ and $HHd_3$ of higher resolutions $RES_2$ and $RES_3$. The circuit 10 is a synthesis circuit corresponding to the analysis circuit 2 described above and reconstructs the image IMd corresponding to the decoded subbands.

According to a preferred embodiment of the invention, the circuits for breaking down into subbands 2, the coding circuit 3, the decoding circuit 4, the vectorial quantization circuit 5 and the multiplexing circuit 6, all included in the coding device depicted in FIG. 1, are realized by a microprocessor associated with random-access and read-only memories. Likewise, the demultiplexing circuit 7, the decoding circuit 8, the vectorial dequantization circuit 9 and the reconstruction circuit 10, included in the decoding device depicted in FIG. 6, are realised by a second microprocessor associated with random-access and read-only memories.

Figure 8:
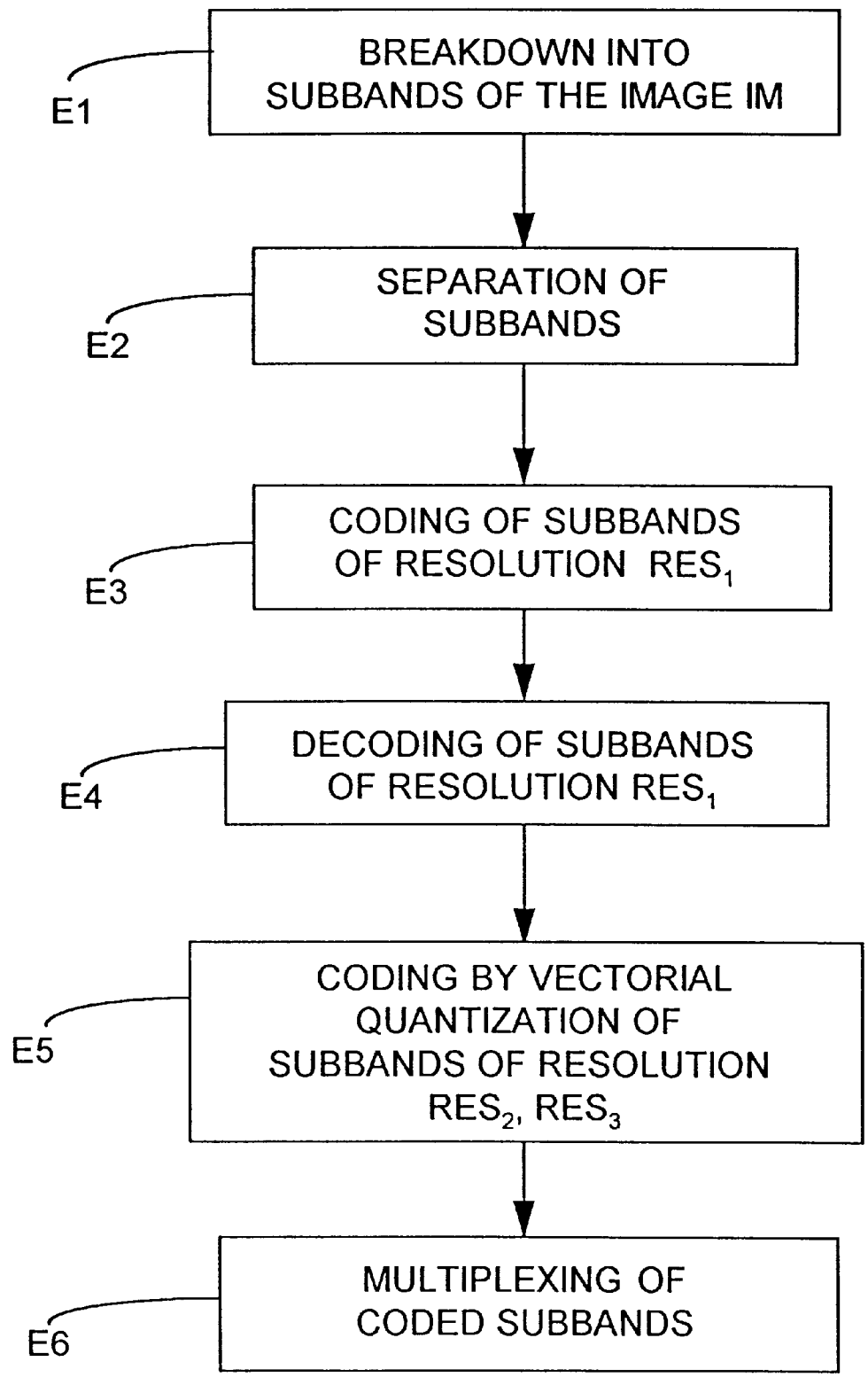
FIG. 8 is an algorithm for coding a digital signal according to the invention.

With reference to FIG. 8, a method according to the invention for coding an image IM, used in the coding device, includes the steps E1 to E6.

Step E1 is the breakdown into subbands of the image IM, as depicted in FIG. 4. The steps E1 results in the subbands $LL_1$, $HL_1$, $LH_1$ and $HH_1$ of lower resolution $RES_1$, the subbands $LH_2$, $HL_2$, $HH_2$ of intermediate resolution RES2 and the subbands $LH_3$, $HL_3$ and $HH_3$ of higher resolution $RES_3$.

The subbands of lower resolution $RES_1$ are separated from the other subbands at step E2.

Step E3 codes the subbands of lower resolution $RES_1$ using a DPCM coding (Differential Pulse Code Modulation) and results in the coded subbands $LLc_1$, $LHc_1$, $HLc_1$ and $HHc_1$.

The subbands coded in step E3 are decoded at step E4 in order to supply the decoded subbands $LLd_1$, $LHd_1$, $HLd_1$ and $HHd_1$. As explained above, it is preferable to use decoded subbands for coding the subbands of higher resolution, as only the decoded information will be available during subsequent decoding.

In step E5, the subbands of higher resolutions $RES_2$ and $RES_3$ are coded by finite state vectorial quantization, in accordance with the sub-steps detailed hereinafter. Step E5 results in the coded subbands $HLc_2$, $LHc_2$, $HHc_2$, $HLc_3$, $LHC_3$ and $HHC_3$.

The coded subbands of all resolution levels are multiplexed at step E6 before being transmitted in a conventional manner to a receiver.

Figure 9:
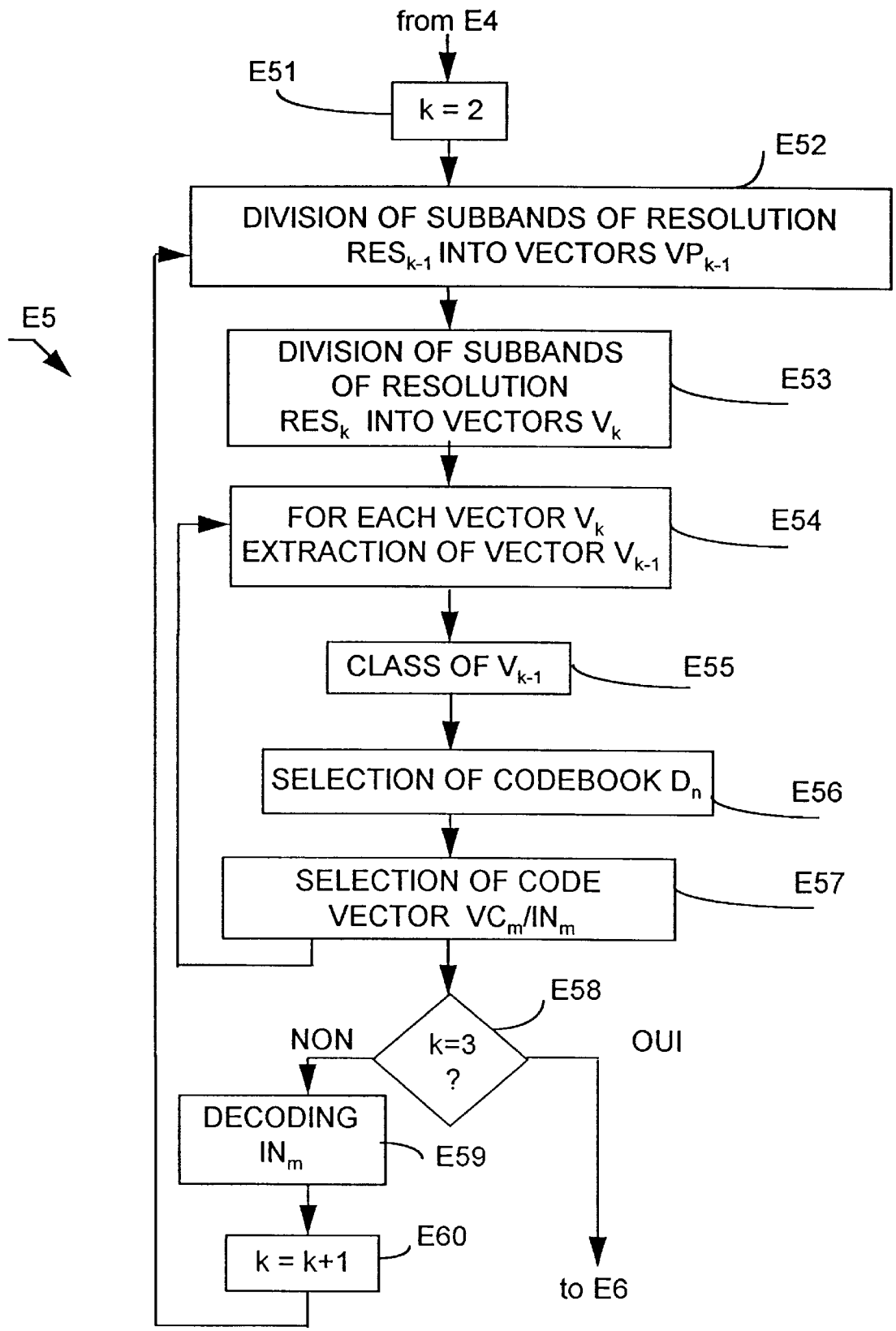
FIG. 9 is a vectorial quantization algorithm included in the algorithm of FIG. 8.

FIG. 9 depicts the coding of the subbands of resolution $RES_2$ and $RES_3$ by finite state vectorial quantization, in accordance with the invention. This coding, effected at step E5, includes the steps E51 to E58.

The sub-step E51 is the initialisation of a working variable k at 2. The variable k represents the order of the resolution levels.

The sub-step E52 is the division of the subbands of resolution $RES_{k-1}$ into parent vectors $VP_{k-1}$ of predetermined size. The parent vectors $VP_{k-1}$ are blocks of two by two adjacent coefficients of each subband of resolution $RES_{k-1}$.

The sub-step E53 is the division of the subbands of resolution $RES_k$ into vectors to be coded $V_k$ of predetermined size. The vectors $V_k$ are blocks of four by four adjacent coefficients of each subband.

The sub-step E54 is the determination, for each vector to be coded $V_k$, of the parent vector $VP_{k-1}$ corresponding to the same position in the original image and situated in the subband of the same orientation and of resolution $RES_{k-1}$.

The sub-step E55 is the determination of the class of the parent vector $VP_{k-1}$ by comparing each of its coordinates with thresholds, as described above.

The sub-step E56 is the selection of the codebook $D_n$ from the codebook $D_1$ to $D_N$ stored in the memory of codebooks. The codebook $D_n$ is selected in accordance with the class of the parent vector $VP_{k-1}$.

The sub-step E57 is the selection of the code vector $VC_m$ from the codebook $D_n$, in accordance with the vector $V_k$. The index $IN_m$ associated with the code vector $VC_m$ is a compressed form of the vector $V_k$.

The sub-step E58 verifies whether all the resolution levels have been processed.

If there is still a resolution level to be coded, the algorithm passes to sub-step E59 in order to decode the subbands of resolution $RES_k$ coded at sub-steps E54 to E57, and then to sub-step E60 in order to increment the variable k by one unit. The decoding sub-step E59 is similar to the decoding effected in the decoder and described hereinafter.

The algorithm then returns to sub-step E52 in order to divide the subbands of resolution $RES_{k-1}$ into parent vectors $VP_{k-1}$ having a size of two by two coefficients.

The sub-steps E53 to E57 lead to the coding of the vectors of the subbands of resolution $REs_k$.

When all the subbands have been coded, that is to say when the response is positive at sub-step E58, the algorithm passes to the step E6 described above.

Figure 10:
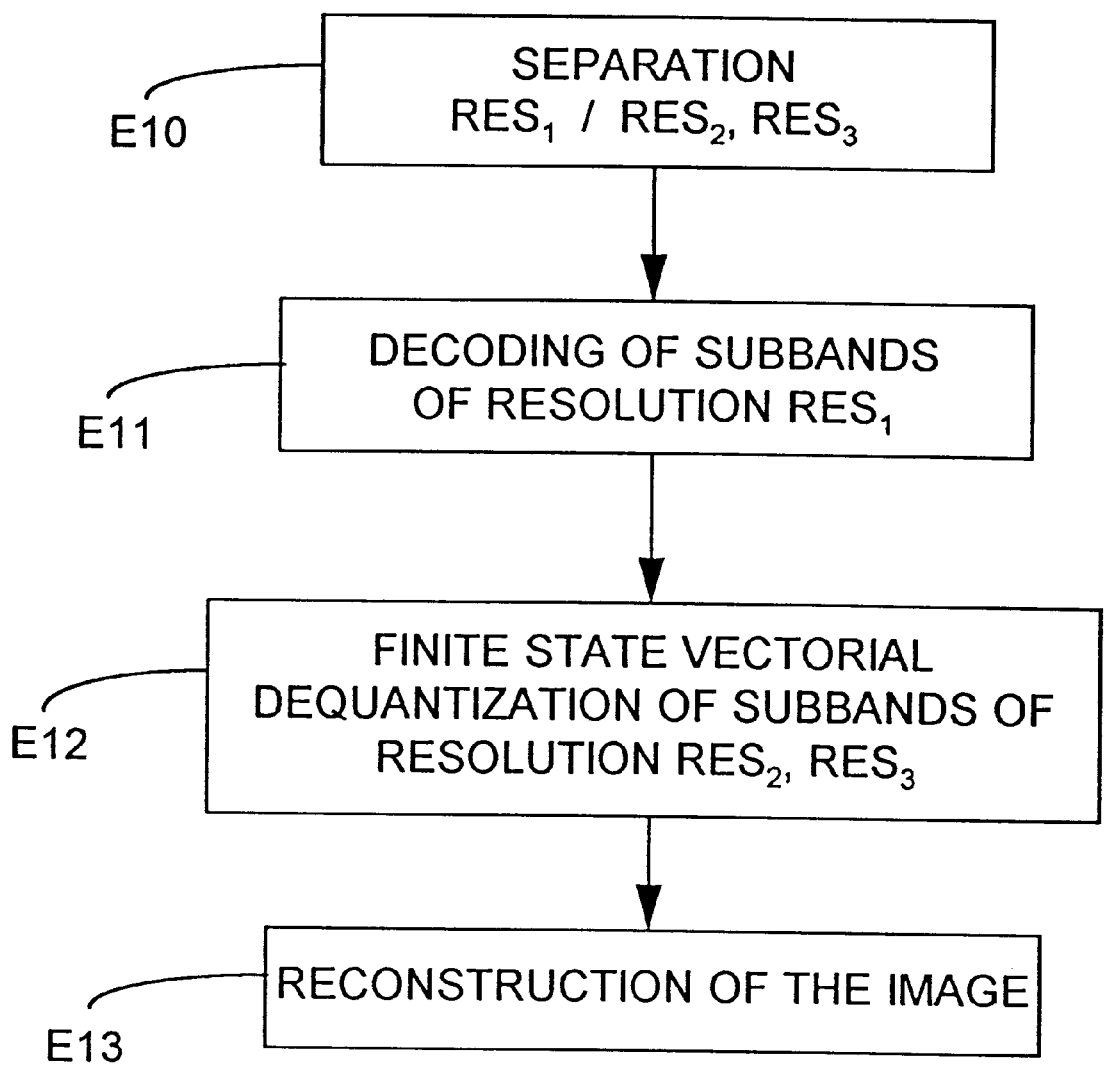
FIG. 10 is an algorithm for decoding a digital signal according to the invention.

With reference to FIG. 10, a method according to the invention for decoding an image IM, used in the decoding device, comprises the steps E10 to E13.

Step E10 is the separation of the subbands of resolution $RES_1$ from the subbands of higher resolutions $RES_2$ and $RES_3$.

The subbands of resolution $RES_1$ are decoded at step E11.

Step E12 is the finite state vectorial dequantization of the subbands of higher resolutions $RES_2$ and $RES_3$, which is detailed hereinafter.

Step E13 is the reconstruction of the image, which can then be displayed on a screen.

Figure 11:
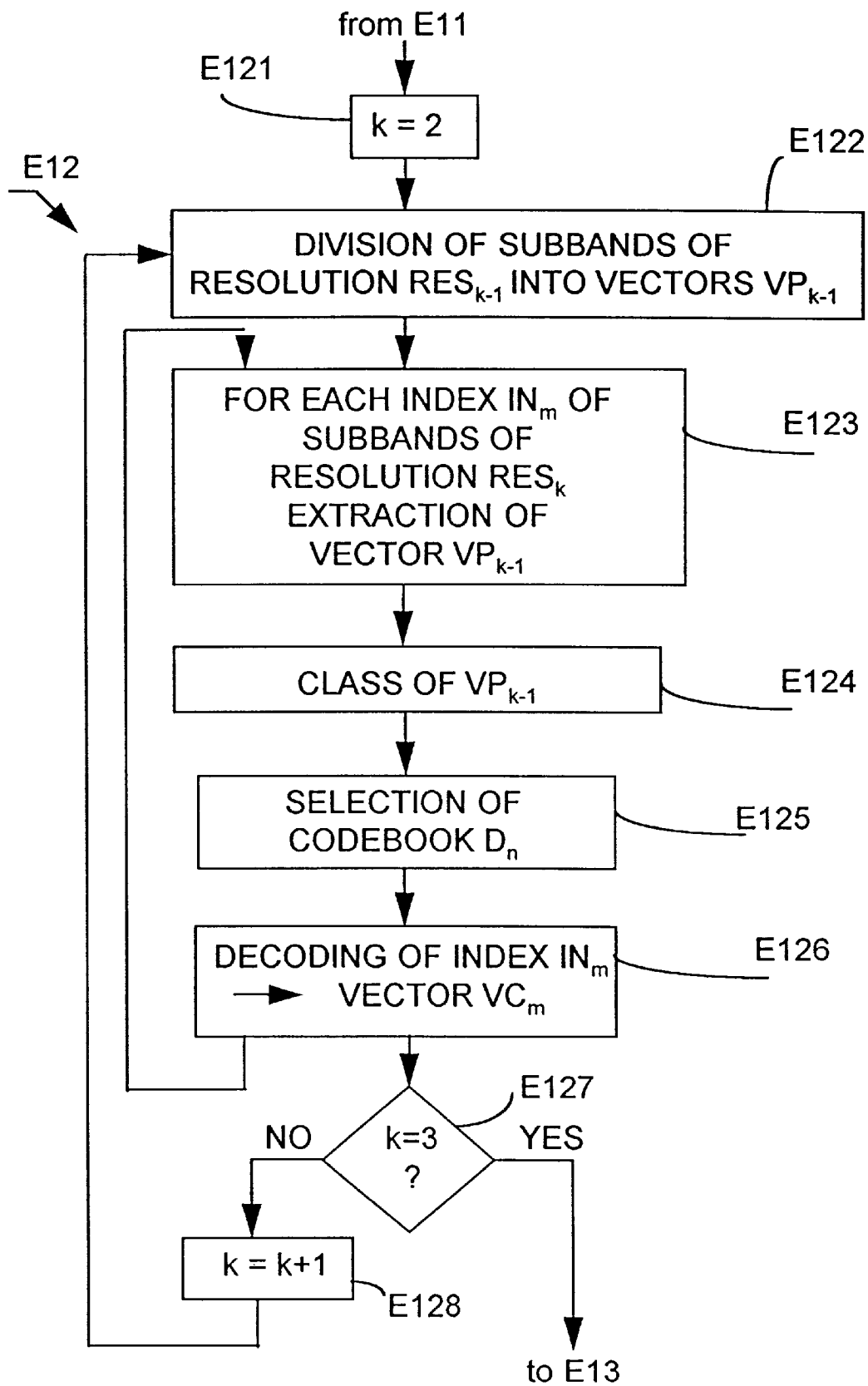
FIG. 11 is a vectorial deguantization algorithm included in the algorithm of FIG. 10.

FIG. 11 shows the composition of the vectorial dequantization step E12. Step E12 includes the sub-steps E121 to E128.

The sub-step E121 is the initialisation of the working variable k at 2.

The sub-step E122 is the division of the subbands of resolution $RES_{k-1}$, decoded at step E11 when k=2. The subbands of resolution $RES_{k-1}$ are divided into parent vectors $VP_{k-1}$ of size equal to two by two coefficients.

The sub-steps E123 to E126 are passed through successively for each coding index $IN_m$ of the subbands of resolution $RES_k$.

The sub-step E123 is the extraction of the parent vector $VP_{k-1}$ corresponding to the position of an index $IN_m$.

The sub-step E124 is the determination of the class of the parent vector $VP_{k-1}$ by comparing each of its coordinates with thresholds.

The sub-step E125 is the selection of the codebook $D_n$ in accordance with the class of the parent vector $VP_{k-1}$.

The index $IN_m$ is decoded at sub-step E126 in order to supply the code vector $VC_m$ which is extracted from the codebook $D_n$.

The aim of the sub-step E127 is to verify whether all the resolution levels have been processed.

If at least one resolution level still has to be decoded the algorithm passes to sub-step E128 in order to increment by one unit the working variable k.

The algorithm then returns to the sub-step E122 in order to divide, into parent vectors of two by two coefficients in size, the subbands which have previously been decoded at sub-steps E123 to E126.

The subbands of resolution $RES_k$ are then decoded at sub-steps E123 to E126.

When all the subbands of all resolutions have been decoded, the algorithm passes to the step E13.

Naturally, the present invention is in no way limited to the embodiments described and depicted, but encompasses, on the contrary, any variant within the capability of persons skilled in the art.

In particular, the invention can easily be applied to other types of signal.

These signals can be mono-dimensional signals such as sounds or seismic recordings, or electrocardiograms; depending on their nature, the analysis of the signals is effected according to temporal or spatial frequencies.

These signals can be three-dimensional such as video sequences represented in two spatial frequencies and one temporal frequency. Breakdown into frequency subbands is then implemented in dimension three and the breakdown of the signal into vectors is also effected in dimension three.

For a signal having components in several frequency bands, such as a colour image signal having red, green and blue components, the invention is applied in each of the frequency bands.

I claim:

1. Method of coding a digital signal by dividing the signal into a plurality of vectors and comparing each of these vectors with code vectors ($VC_m$) forming part of a plurality of codebooks ($D_n$), including a step (E1) of analyzing the digital signal (IM) in a plurality of frequency subbands distributed in accordance with at least two different resolutions ($RES_1$, $RES_2$, $RES_3$), at least one first subband having a lower resolution and at least one second subband having a higher resolution, characterised in that it includes, for each second subband, the steps of:
   selecting (E51) a first subband, wherein each second subband and its respective selected first subband are of a same orientation,
   dividing (E52) the selected first subband into first vectors ($VP_{k-1}$),
   dividing (E53) the second subband into second vectors ($V_k$),
   extracting (E54) from the selected first subband, for each of the second vectors, a first vector linked by a predetermined relationship to the respective second vector,
   selecting (E55, E56), for each of the second vectors, a codebook from the plurality of codebooks, in accordance with the respective extracted first vector, and
   coding (E57) each of the second vectors by selecting a code vector from the respective selected codebook in order to form a second coded subband.

2. Coding method according to claim 1, characterised in that the first and second vectors linked by a predetermined relationship correspond to a same position in the signal.

3. Coding method according to either one of claims 1 and 2, characterised in that the first subband is coded and then decoded prior to the step of dividing it into first vectors.

4. Coding method according to either one of claims 1 and 2, characterised in that the digital signal is an image signal (IM).

5. Method for decoding a digital signal coded by the method according to either one of claims 1 and 2, characterised in that it includes, for each second subband, the steps of:
- selecting (E121) a first subband,
- extracting (E123), for each of the second coded vectors of the second coded subband, a first vector of the selected first subband, linked by the predetermined relationship to the second coded vector,
- selecting (E124, E125), for each of the second coded vectors of the second coded subband, a codebook from a plurality of codebooks, in accordance with the respective extracted first vector, and
- decoding (E126) each of the second coded vectors of the second coded subband by selecting a code vector from the respective selected codebook in order to form a second decoded subband.

6. Decoding method according to claim 5, characterised in that, when the selected first subband is coded, it includes the prior step of decoding the selected first coded subband.

7. Database management system using the decoding method according to claim 5.

8. Computer using the decoding method according to claim 5.

9. Coding method according to either one of claims 1 and 2, characterised in that the second subband is of a resolution immediately above the respective selected first subband.

10. Digital camera using the coding method according to either one of claims 1 and 2.

11. Database management system using the coding method according to either one of claims 1 and 2.

12. Computer using the coding method according to either one of claims 1 and 2.

13. Device for coding a digital signal (IM) by dividing the signal into a plurality of vectors and comparing each of these vectors with code vectors forming part of a plurality of codebooks, having a means of storing to memory (53) the plurality of codebooks and a means of analyzing (2) the digital signal in a plurality of frequency subbands distributed in accordance with at least two different resolutions, at least one first subband having a lower resolution and at least one second subband having a higher resolution, further comprising, for processing each second subband:
- means for dividing (54) a selected first subband into first vectors, wherein each second subband and its respective selected first subband have a same orientation,
- means for dividing (51) the second subband into second vectors,
- means for extracting (54) from the selected first subband, for each of the second vectors, a first vector linked by a predetermined relationship to the second vector,
- means for selecting (55), for each of the second vectors, a codebook from the plurality of codebooks, in accordance with the respective extracted first vector, and
- means for coding (52, 53) each of the second vectors by selecting a code vector from the respective selected codebook in order to form a second coded subband.

14. Coding device according to claim 13, characterised in that the first and second vectors linked by a predetermined relationship correspond to a same position in the signal.

15. Computer including the coding device according to either one of claims 13 and 14.

16. Coding device according to either one of claims 13 and 14, characterised in that it has a means (3) of coding the first subband into a first coded subband and a means (4) of decoding the first coded subband.

17. Device for decoding a digital signal coded by the device according to either one of claims 13 and 14, having a means of storing to memory (93) a plurality of codebooks, further comprising for each second subband:
- means for extracting (94), for each of the second coded vectors of the second coded subband, a first vector of the selected first subband, linked by the predetermined relationship to the second coded vector,
- means for selecting (95), for each of the second coded vectors of the second coded subband, a codebook from the plurality of codebooks, in accordance with the respective extracted first vector, and
- means for decoding (92, 93) each of the second coded vectors of the second coded subband, by selecting a code vector from the respective selected codebook in order to form a second decoded subband.

18. Database management system including the decoding device according to claim 17.

19. Computer including the decoding device according to claim 17.

20. Digital camera including the coding device according to either one of claims 13 and 14.

21. Database management system including the coding device according to either one of claims 13 and 14.

* * * * *

UNITED STATES PATENT AND TRADEMARK OFFICE
CERTIFICATE OF CORRECTION

PATENT NO. : 5,995,027
DATED : November 30, 1999
INVENTOR(S) : FÉLIX HENRY

It is certified that error appears in the above-identified patent and that said Letters Patent is hereby corrected as shown below:

ON THE COVER PAGE

COLUMN [56] References Cited, after Attorney, Agent, or Firm

"Fitzpatrick Cella Harper & Scinto" should read --Fitzpatrick, Cella, Harper & Scinto--.

COLUMN 2

Line 24, "extracted," should read--extracted, and--; and
Line 46, "extracted," should read--extracted, and--.

COLUMN 3

Line 35, "extracted," should read--extracted, and--; and
Line 52, "extracted," should read--extracted, and--.

COLUMN 4

Line 5, "drawings, in" should read --drawings.--; and
Line 6, "which." should be deleted.

UNITED STATES PATENT AND TRADEMARK OFFICE
CERTIFICATE OF CORRECTION

PATENT NO.   : 5,995,027
DATED        : November 30, 1999
INVENTOR(S)  : FÉLIX HENRY It is certified that error appears in the above-identified patent and that said Letters Patent is hereby corrected as shown below:

COLUMN 7

Line 62, "book." should read --books.--.

COLUMN 8

Line 50, "by" (first occurrence) should read --be--.

COLUMN 10

Line 27, "steps" should read --step--;
    Line 29, "RES2" should read --$RES_2$--; and
    Line 53, "resolution" should read --resolutions--.

COLUMN 11

Line 11, "codebook" should read --codebooks--; and
    Line 31, "$REs_k$" should read --$RES_k$--.

UNITED STATES PATENT AND TRADEMARK OFFICE
CERTIFICATE OF CORRECTION

PATENT NO. : 5,995,027
DATED : November 30, 1999
INVENTOR(S) : FÉLIX HENRY

It is certified that error appears in the above-identified patent and that said Letters Patent is hereby corrected as shown below:

<u>COLUMN 12</u>

Line 21, "signal." should read --signals.--.

Signed and Sealed this

Twentieth Day of March, 2001

Attest:

NICHOLAS P. GODICI

Attesting Officer

Acting Director of the United States Patent and Trademark Office